United States Patent
Da'na et al.

(10) Patent No.: US 11,806,659 B1
(45) Date of Patent: Nov. 7, 2023

(54) SELF-REGENERATED AND ECO-FRIENDLY AIR PURIFICATION DEVICE

(71) Applicant: KING FAISAL UNIVERSITY, Al-Ahsa (SA)

(72) Inventors: Enshirah Da'na, Al-Ahsa (SA); Sukenah Abdullah Alsawad, Al-Ahsa (SA); Haifa Mohammed Aldossary, Al-Ahsa (SA); Wedyan Mohanna Aldossary, Al-Ahsa (SA); Fatimah Yousef Alkhamees, Al-Ahsa (SA); Budur Ibrahim Alkhars, Al-Ahsa (SA); Madinah Mohammed Albladi, Al-Ahsa (SA); Budoor Mohammed Allwime, Al-Ahsa (SA)

(73) Assignee: KING FAISAL UNIVERSITY, Al-Ahsa (SA)

(*) Notice: Subject to any disclaimer, the term of this patent is extended or adjusted under 35 U.S.C. 154(b) by 0 days.

(21) Appl. No.: 17/985,125

(22) Filed: Nov. 10, 2022

(51) Int. Cl.
*B01D 53/04* (2006.01)
*B01D 53/00* (2006.01)

(52) U.S. Cl.
CPC ....... *B01D 53/0462* (2013.01); *B01D 53/007* (2013.01); *B01D 53/0438* (2013.01);
(Continued)

(58) Field of Classification Search
CPC .. B01D 53/04; B01D 53/0462; B01D 53/007; B01D 53/0438; B01D 53/0446; B01D 53/0454; B01D 2253/102; B01D 2257/504
(Continued)

(56) References Cited

U.S. PATENT DOCUMENTS

| 6,199,397 B1 | 3/2001 | Khelifa et al. |
| 9,597,627 B2 | 3/2017 | Zhang |

(Continued)

FOREIGN PATENT DOCUMENTS

| CN | 107376588 A | 11/2017 |
| CN | 210569012 A | 5/2020 |

(Continued)

OTHER PUBLICATIONS

Raso et al., "Indoor Air Purification Using Activated Carbon Adsorbers: Regeneration Using Catalytic Combustion of Intermediate Stored VOC", Ind. Eng. Chem. Res. (2014), vol. 53, No. 49, pp. 19304-19312.

(Continued)

*Primary Examiner* — Frank M Lawrence, Jr.
(74) *Attorney, Agent, or Firm* — Nath, Goldberg & Meyer; Richard C. Litman

(57) ABSTRACT

The self-regenerated and eco-friendly air purification device uses an adsorption material retained in a housing, the adsorption material capable of adsorption of carbon dioxide. A fan causes air to flow over the adsorption material, thereby extracting excess carbon dioxide from room air at room temperature. A heater is provided, and activation of the heater causes discharge of the adsorbed carbon dioxide from the adsorption material, thereby regenerating the adsorption material to adsorb more carbon dioxide. In one configuration, the adsorption material includes activated carbon (or any other $CO_2$ adsorbent) and is capable of adsorption of carbon dioxide ($CO_2$), and activation of the heater causes discharge of the $CO_2$ adsorbed by the adsorption material.

10 Claims, 3 Drawing Sheets

(52) U.S. Cl.
CPC ..... *B01D 53/0446* (2013.01); *B01D 53/0454* (2013.01); *B01D 2253/102* (2013.01); *B01D 2257/504* (2013.01)

(58) Field of Classification Search
USPC .......... 95/1, 8, 14, 18, 90, 139, 148; 96/111, 96/112, 134, 142, 144, 146; 423/230
See application file for complete search history.

(56) References Cited

U.S. PATENT DOCUMENTS

| | | | | |
|---|---|---|---|---|
| 11,110,386 | B2 * | 9/2021 | Matsumoto | B60H 3/0633 |
| 2007/0089605 | A1 * | 4/2007 | Lampinen | F24F 8/90 95/139 |
| 2017/0087963 | A1 * | 3/2017 | Tajima | B01D 53/0415 |
| 2018/0222290 | A1 | 8/2018 | Anderson et al. | |
| 2020/0223293 | A1 * | 7/2020 | Matsumoto | B01D 53/04 |
| 2021/0370221 | A1 * | 12/2021 | Stavova | B01D 53/0446 |
| 2022/0226767 | A1 * | 7/2022 | Matsumoto | B01D 53/0438 |

FOREIGN PATENT DOCUMENTS

| | | | | |
|---|---|---|---|---|
| GB | 2248195 | A | | 4/1992 |
| GB | 2426469 | A | * | 11/2006 ......... B01D 53/0415 |

OTHER PUBLICATIONS

"Vremi Premium True HEPA Air Purifier for Large Rooms", Amazon.com, printed from Internet Jul. 5, 2022, 10 pages.
"Active Air 12 Carbon Filter Fan Exhaust Kit", Hydrobuilder.com, printed from Internet Jul. 5, 2022, 4 pages.
Kumar et al., "Power Efficient Air Purifier Employing PM2.5 Air Dust Monitor Employing Embedded Module", Journal of Algebraic Statistics, vol. 13, No. 1, pp. 892-899, (2022).
Chiou et al., "A Senior Design Project: The Design of an Experimental Carbon Dioxide Capture System for Enhancing Student Learning on Green Enery Manufacturing", 126th Annual Conference & Exposition, ASEE (2019), 10 pages.

* cited by examiner

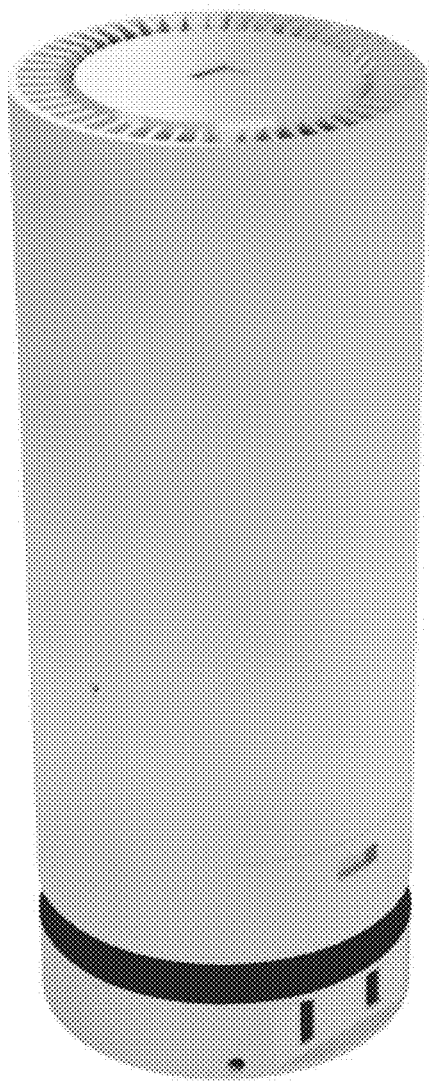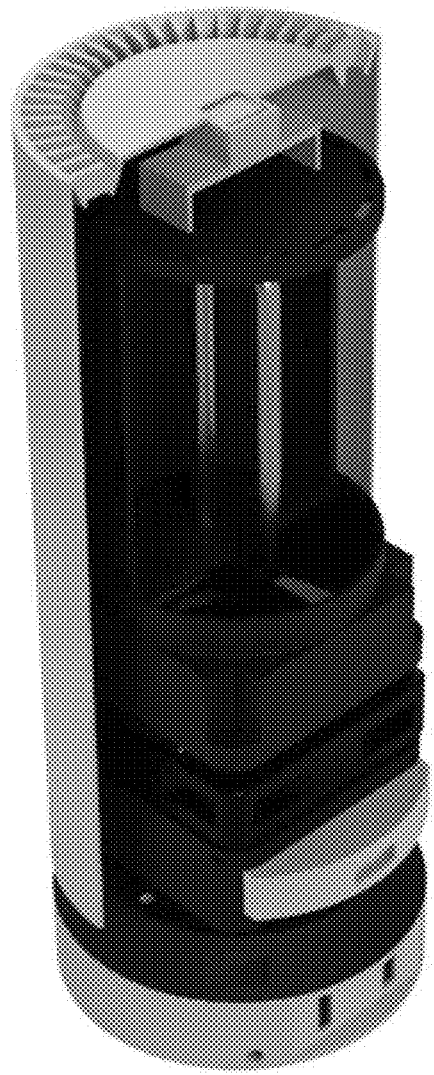
FIG. 1A
FIG. 1B

SELF-REGENERATED AND ECO-FRIENDLY AIR PURIFICATION DEVICE

BACKGROUND

1. Field

The present disclosure relates generally to air purification, and particularly to a self-regenerated and eco-friendly air purification device.

2. Description of the Related Art

Many studies have linked several health issues to poor indoor air quality and poor ventilation. As we breathe in oxygen ($O_2$) and breathe out carbon dioxide ($CO_2$), the $CO_2$ concentration in an occupancy space increases. Low ventilation rates with the outside atmosphere results in higher $CO_2$ concentrations indoors, and it is not always possible to ventilate the indoor space, especially in conditions in which outside ventilation is restricted. This can be a problem in locations with hot and humid climates, and with dusty air conditions due to weather conditions, such as those often found in Saudi Arabia. As a result, children, elderly people, and people with cardiovascular and respiratory diseases (such as asthma and allergies) will suffer because of oxygen deficiency. Therefore, it would be desirable to provide a simple, eco-friendly, self-regenerated, and relatively cheap air purification system.

The International Electrotechnical Commission (IEC) code sets standards for HVAC in commercial buildings, at IEC C-2009, Section 503. Requirements include a minimum supply of outside air, which varies according to building occupancy. Accordingly, during low occupancy of a room, outside air is reduced to a minimum rate needed to exhaust such conditions as plastic off-gassing (sick building syndrome), but is increased when the room becomes crowded. Despite this, $CO_2$ concentrations in the occupancy space can vary and may exceed desirable levels, especially during periods of high occupancy.

In many environments, controlled exterior air ventilation using filtered, conditioned air is not integrated into the HVAC system. In some cases, an HVAC system may have automatic or manual recirculation and ventilation control, but not be directly responsive to $CO_2$ levels. While $CO_2$ is described, it is also conceivable that extraction of other contaminants may be desired. Thus, a self-regenerated and eco-friendly air purification device solving the aforementioned problems is desired.

SUMMARY

The self-regenerated and eco-friendly air purification device provides airborne contaminant adsorption performed using an adsorption material retained in a housing, in which the adsorption material is capable of adsorption of the airborne containment. A fan is used to cause air to flow over the adsorption material, thereby extracting the airborne contaminant from the air, which may be at a predetermined range of room temperatures. A heater is provided, so that activation of the heater causes discharge of the airborne contaminant adsorbed by the adsorption material, thereby regenerating the adsorption material in its adsorption function, either in a well-ventilated area or during times of low occupancy. A control unit is capable of selectively activating the heater to discharge the airborne contaminant from the adsorption material. It is further possible to sense the contaminant, so that, upon sensing predetermined levels of the contaminant, the fan is activated to cause the air flow over the adsorption material.

In one example, the target airborne contaminant is carbon dioxide ($CO_2$). The adsorption material may be activated carbon (or any other $CO_2$ adsorbent).

These and other features of the present subject matter will become readily apparent upon further review of the following specification and drawings.

BRIEF DESCRIPTION OF THE DRAWINGS

FIG. 1A is a perspective view of an exemplary self-regenerated and eco-friendly air purification device.

FIG. 1B is a perspective view of the self-regenerated and eco-friendly air purification device of FIG. 1A, shown with the housing broken away.

Similar reference characters denote corresponding features consistently throughout the attached drawings.

DETAILED DESCRIPTION OF THE PREFERRED EMBODIMENTS

Figure 2:
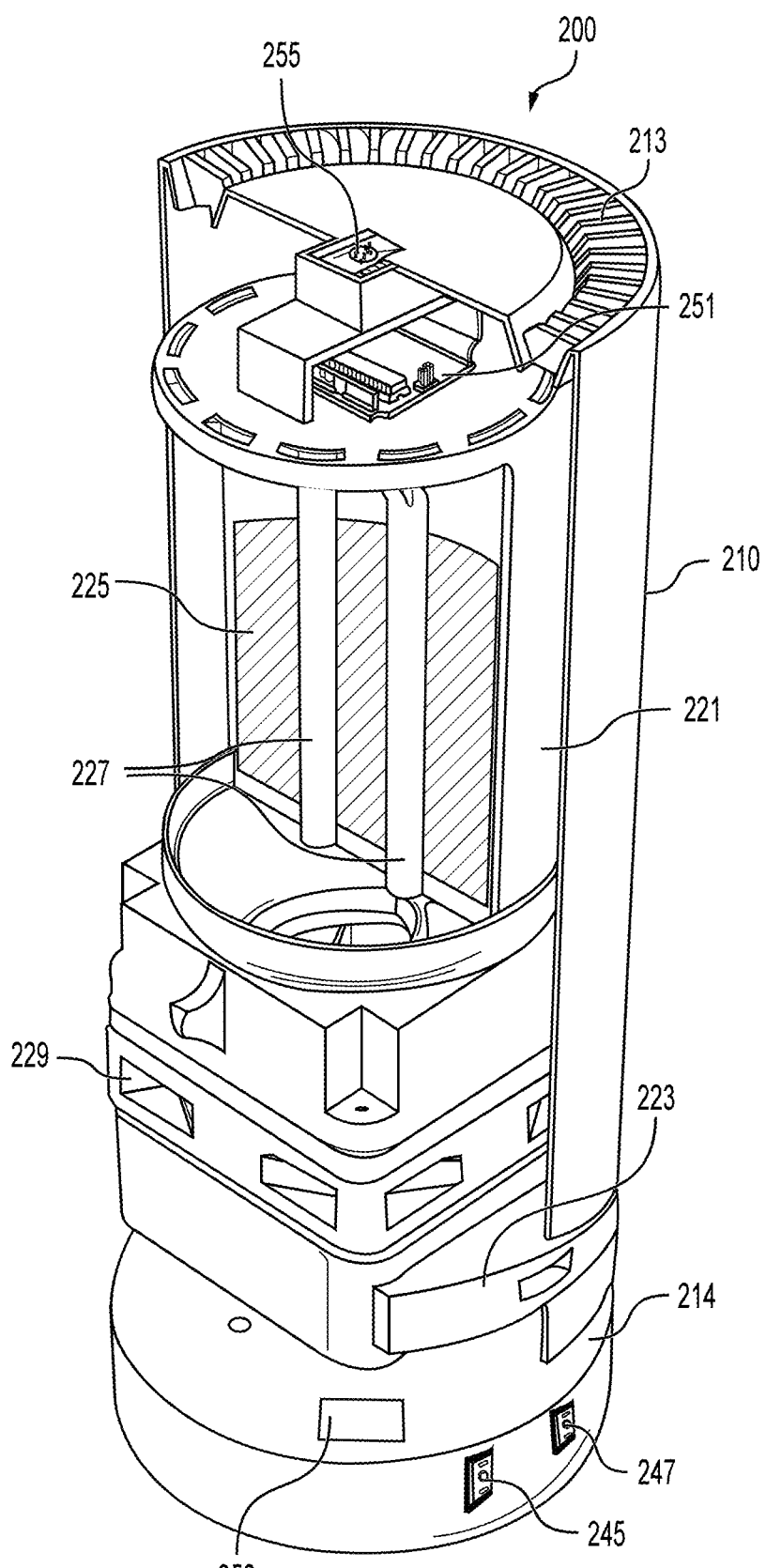
FIG. 2 is a perspective view in section of the self-regenerated and eco-friendly air purification device of FIG. 1A.

The present self-regenerated and eco-friendly air purification device relates generally to air purification in an occupancy space. More specifically, an air purification device using an adsorption column is disclosed. The air purification device includes a cylindrical housing having an intake fan and a filter to remove any solid air pollutant. The adsorption column contains an adsorbent (activated carbon, or any other $CO_2$ adsorbent) to capture carbon dioxide ($CO_2$) and adsorb the $CO_2$ on the surface of the adsorbent when the system is operating in its purification mode. A sensor measures the $CO_2$ levels and is connected to a display screen on the top surface of the housing.

When the $CO_2$ reading stabilizes while the device is operating in the purification mode, this indicates that the adsorbent is saturated, and the user should switch the system to its regeneration mode by pressing a regeneration switch on the side of the housing. In the regeneration mode, a heater in the column heats the adsorbent, thereby regenerating the adsorbent. The regeneration may be performed with the device outside the occupancy area, or inside the occupancy area at a time when room occupancy is sufficiently low enough for the $CO_2$ to be adequately vented, or under other conditions that provide sufficient ventilation of the $CO_2$ from the room.

The disclosed technology can be used in a wide variety of closed environments, and, for example, may be useful in such gathering places as schools, hospitals, businesses, and homes, where $CO_2$ levels can increase to undesirable levels. Additionally, the disclosed technology can be used where other air contaminants, which can be adsorbed by activated carbon or other adsorbent materials, can be extracted by the adsorbent material.

The self-regenerated and eco-friendly air purification device is designed to work in two different modes. If the adsorption air purifier is activated, a $CO_2$ sensor will measure the current $CO_2$ level, and it is connected to a display screen that can display the sensor reading. Depending on the displayed $CO_2$ reading, a determination is made as to whether $CO_2$ filtration is required. If the $CO_2$ level is high, a $CO_2$ purification mode is turned on, in which $CO_2$ is removed, either as a stand-alone function, or in combination with other filtration and conditioning functions.

The working principle of the $CO_2$ purification is to intake the air by a fan and let it pass through a filter media where the air pollutants are retained or trapped. The pollutants can range from large particles to very small particles, including microbes and virus-transporting mediums. The air will also pass through an adsorbent column that contains the adsorbent to capture $CO_2$ from the air and retain the $CO_2$ on the surface of the adsorbent. Then the clean air will exit via the exit portals.

When the $CO_2$ reading stabilizes or increases for a predetermined time period while the device is operating in the purification mode, this is considered to be an indication that the adsorbent is saturated with $CO_2$ and should be regenerated. For example, the time period for a stable high $CO_2$ level or an increased $CO_2$ level can be 30 minutes, which accommodates levels of $CO_2$ caused by intermittent activity. In case of an indication that the adsorbent is saturated with $CO_2$, the user or an automated control and evaluation unit would turn on the regeneration switch. The recycling of the adsorbent will be done by heating the adsorbent to an elevated temperature, using a heater inside the column. The elevated temperature is compatible with operation in an HVAC system, or routine handling of the adsorption device. During the regeneration process, the device will preferably be in a high ventilation area to avoid the risk of returning $CO_2$ inside the room again. The ventilation can be by exhaust ducting to the outside or by physically moving the adsorption or absorbent device to an outside area.

In an exemplary device, the heating of the adsorbent for regeneration of the adsorbent material is in the range of 40°–50° C. The temperature range for heating the adsorbent is selected to be in excess of normal room temperature when the room is occupied. For example, if a comfortable range is 16°–24° C., but in some circumstances, the room temperature may increase to 30° C., then room temperature may range to 30° C. at the high end. At the low end, the temperature is not critical because adsorption is likely to occur for most contaminants, including $CO_2$, at temperatures that are lower than the comfortable range for room temperature. It is anticipated that, at times, the temperature of the room will be outside a normal comfort range for indoor spaces, but may still be occupied. By selecting a wide range of room temperatures, adsorption can occur, but by heating the adsorbent, the adsorbed contaminants can be discharged.

The heating of the adsorbent and the discharge of the contaminants can occur indoors, provided that the ventilation of the room is sufficient to out-vent the contaminants before the next expected occupancy. In most cases, this can be a slow process because the maximum contamination during a period of occupancy would not be expected to exceed safe levels. If the heating and discharge of the adsorbent does not significantly raise the contaminant to unsafe levels, ordinary room maintenance, e.g., cleaning, can be performed during the contaminant discharge process. The end result is that the adsorbent would be regenerated, meaning the adsorbent material is able to adsorb additional contaminants when the room occupancy or use of the room is such that the contaminants would reach an undesirable level.

The disclosed adsorption air purification device can be used for maintaining air quality in rooms that are occasionally occupied by large numbers of people, when the occupancy would be expected to be sufficient to substantially increase the $CO_2$ level in the room. Additionally, the disclosed air purification device provides a self-regenerated and eco-friendly air purification device for patients with health deficiency problems that are aggravated by $CO_2$ or other contaminants in the room.

While adsorption is described, it is also possible to implement the disclosed techniques by absorption or by chemically combining $CO_2$ with the material intended to extract and retain the $CO_2$. However, with adsorption of $CO_2$, it is fairly easy to discharge the adsorbed $CO_2$ by heating the material, and then reuse the adsorption material.

FIGS. 1A and 1B show a self-regenerated and eco-friendly air purification device constructed in accordance with the present disclosure. FIG. 1A shows the air purification device and FIG. 1B is a section view of the air purification device of FIG. 1A. The depiction is of a portable version of the air purification device suitable to be placed in a room in the manner of a floor or table fan. This configuration is exemplary, as the air purification device can be provided as a built-in unit or may be incorporated into the building's HVAC system.

FIG. 2 is a section view of the self-regenerated and eco-friendly air purification device 200 of FIGS. 1A and 1B. The depiction is exemplary, as specific details of the air purification device incorporate features that are configured according to design choice. Depicted are outer cover 210, forming an outer housing, with outlet openings 213 and inlet opening 214. Housed within outer cover 210 is adsorbent column 221 comprising $CO_2$ adsorbent, a filter 223, heater elements 227, and a fan 229. A $CO_2$ sensor 253 is used to sense $CO_2$ in the room and may be conveniently located at inlet opening 214. Purification switch 245 is used to initiate operation of the air purification device 200 and particularly the adsorbent column 221, to extract $CO_2$ from air, which is caused to flow past the adsorbent column 221 by the intake fan 229. Regeneration switch 247 is used to activate the heater 227 to warm $CO_2$ adsorbent 225 to off-gas any adsorbed $CO_2$ and regenerate the adsorbent material. While the fan 229 may be operated at a reduced speed to expel the off-gassed $CO_2$, it is possible that the vertical configuration allows the off-gassed $CO_2$ to discharge by means of convection resulting from the heating within the adsorbent column 221.

Control and evaluation unit 251, which, in the prototype, is implemented as an Arduino microcontroller module, such as an Arduino Uno microcontroller board featuring an ATmega328P microcontroller, is used to control the operation of the air purification device 200. (Arduino and Arduino Uno are trademarks of Interaction Design Institute, of Italy.) Control and evaluation unit 251 responds to the operation of fan 229 and heater elements 227 responsive to signals from purification switch 245 and regeneration switch 247, and sensor 253, if provided. The display screen 255 provides indications of operation of the air purification device 200, and can also be used to provide an indication of $CO_2$ levels sensed by sensor 253.

In the exemplary prototype implementation, the $CO_2$ sensor 253 is an SCD30 $CO_2$ sensor, and the display screen 255 is an SSD1306 OLED display screen.

Figure 3:
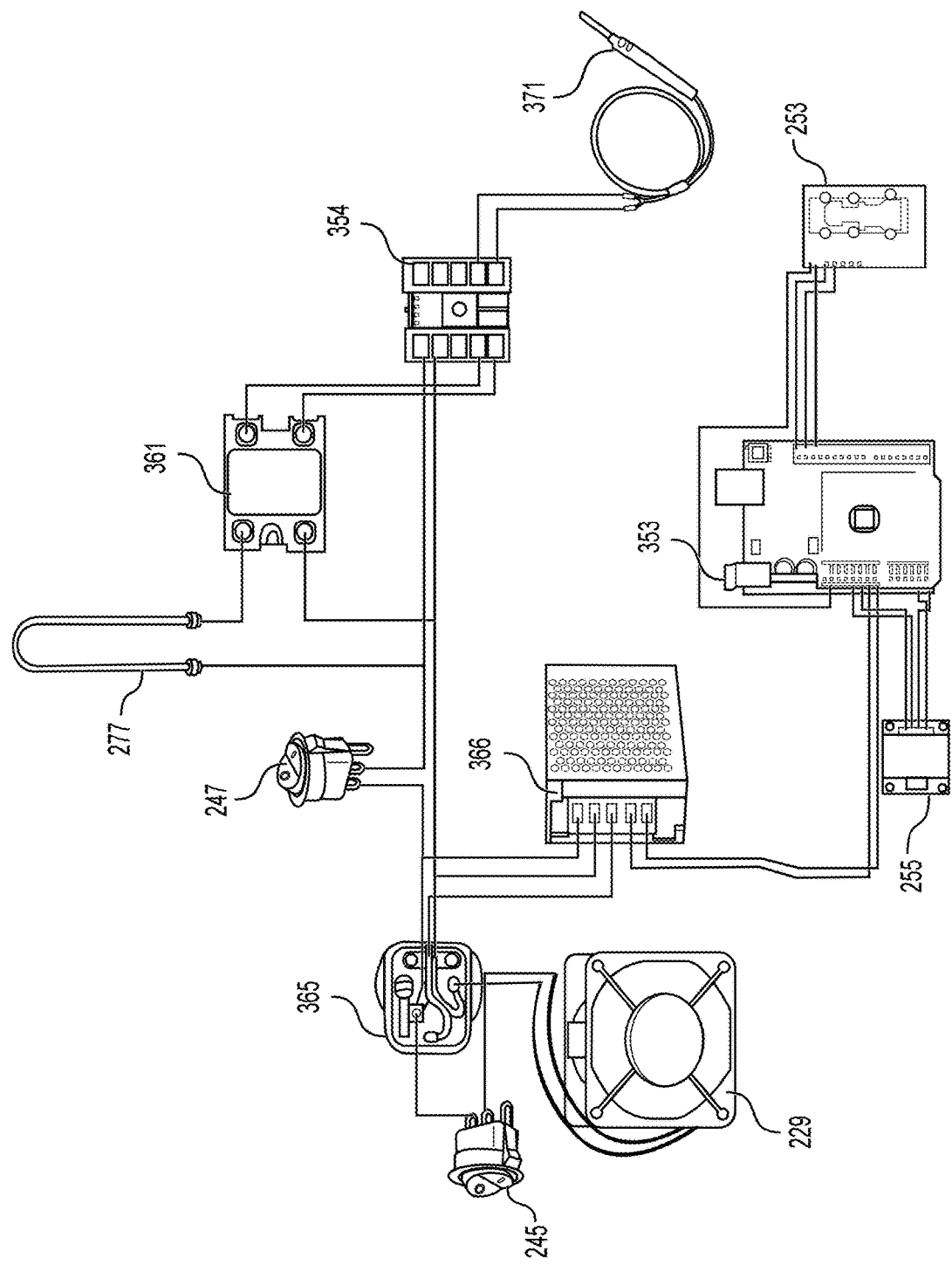
FIG. 3. is a schematic diagram of the self-regenerated and eco-friendly air purification device of FIG. 1A, showing connection between the electrical components of the device.

FIG. 3 is a schematic drawing showing the electrical components used for operation of a prototype version of the air purification device 200. In FIG. 3, control and evaluation unit 251 comprises the depicted Arduino Uno module 353 (depicted as module 251 in FIG. 2), but control and evaluation further incorporates a proportional-integral-derivative (PID) controller 354 and heater relay 361 to regulate the necessary power outputs to handle the power loads, including the power load of heater elements 227. Mains power plug 365 supplies power to a power supply and converter board 366, which, in turn, supplies power to the various electrical components. Also depicted is a thermocouple 371, which is used to directly control the heater relay 361, or to provide the appropriate sensing data to controller module 353 for the purpose of controlling the heater relay 361.

The system's working principle allows the air purification device 200 to be operated in two different modes. The first operation mode is air purification, and the second one is the adsorbent regeneration mode.

The example describes the operation of a stand-alone air purification device 200, using a control and evaluation unit that functions as an automatic controller. The control and evaluation unit may include, for example, the above-described Arduino UNO module 353 and PID controller 354. The use of the PID controller 354 and the specific values given below are by way of non-limiting example of a control and evaluation unit to demonstrate operation of the disclosed air purification device 200.

As implemented, the air purification device 200 is started by connecting the electrical circuits as shown in the block diagram in FIG. 3. The first step was connecting the SCD30 $CO_2$ sensor and the SSD1306 OLED display screen to the Arduino UNO module 353, and the programming code was uploaded to the Arduino UNO module 353 to ensure that they work effectively. This is done by making the connections in the following Table 1:

TABLE 1

Pin connections to Arduino Uno microcontroller board $V_{in}$ pin in the sensor to the 5V pin in the Arduino
GND pin in the sensor to the GND pin in the Arduino
SCL pin in the sensor to SCL pin in the Arduino
SDA pin in the sensor to SDA pin in the Arduino
$V_{in}$ pin in the screen to the 5V pin in the Arduino
GND pin in the screen to the GND pin in the Arduino
SCL pin in the screen to A5 pin in the Arduino
SDA pin in the screen to A4 pin in the Arduino The next step was connecting the heater 227 to the PID controller 354. The heater operation is controlled initially by a mechanical on/off regeneration mode switch 247. If the switch button 247 is turned on, the PID controller 354 will control the heater's operation. One of the heater connection terminals is connected directly to the socket, as the heater works on a.c. mains current, for example 220 VAC. The other terminal is connected to the heater relay 361 in an AC output terminal to control its operation. Heater relay 361 input terminals are connected to the PID controller 354 in their specified places, as heater relay 361 receives the order from the PID controller 354 to selectively deliver the voltage to the heater. Also, the thermocouple terminals are connected to their probed places on the PID controller 354 and works by sensing the heater temperature and sending the readings to the PID controller 354. Based on the received reading, the PID controller 354 sends the command to the heater relay 361 to deliver the voltage, thereby controlling the heater temperature.

When the air purification device 200 is connected to AC mains, the power will be delivered to the power supply board directly. In the power supply board, the voltage will be converted from AC to DC. Then, a step-down converter will decrease or step down the voltage that comes from the power supply and converter 366 to operate the PID controller 354, to which the $CO_2$ sensor 253 and display screen 255 are connected.

If the purification switch 245 is actuated, power will be supplied to the fan 229 and operate the system for the adsorption and purification process. In contrast, if regeneration switch 247 is activated, the power will be supplied to the PID controller 354, which will control the operation of the electrical heater with the help of heater relay 361 and a thermocouple. In general, the adsorption material is formulated to adsorb $CO_2$ at expected room temperatures, and expel $CO_2$ at temperatures elevated above expected room temperature. In general, room temperature would be below 25° C., although in some cases, room temperature may be higher, for example 30° C. At a low end, room temperature may be 16° C., but adsorption is expected to occur at temperatures that are significantly below common room temperature.

It would be possible to use a contaminant sensor, such as a $CO_2$ sensor, to cause the fan 229 to turn on. That way, the adsorption air purifier 200 can remain in a standby mode, but would automatically activate when the contaminant is sensed. The regeneration cycle would typically be manual, although in some cases, automatic operation can be implemented, e.g., by sensing light or time of day.

Regeneration is initiated by heating the $CO_2$ adsorption material, causing the $CO_2$ adsorption material to release the $CO_2$, which is then expelled. As discussed before, the regeneration process can be done in the range of 40° C. to 50° C. Therefore, the heater temperature needs to be controlled. For controlling the heater temperature, a PID controller 354 will be used to fix the temperature at a specific value with the help of a relay which will function as a switch. When the thermocouple senses the heater temperature below the specified value, the relay will turn the heater on until it reaches the target temperature. When the temperature exceeds the specified value, the relay will turn the heater off to cool until it reaches the specified temperature. This ensures that the heater operates at a specific temperature for the regeneration process. It is noted that, once the $CO_2$ is expelled from the $CO_2$ adsorption material, the $CO_2$ need not be heated, but would need to be discharged from the room in order to allow the $CO_2$ adsorption material to adsorb additional $CO_2$.

In order to implement the design, the size of the outer housing structure and the column that will contain the adsorbent and the heater is designed to fit with the size of the room in the manner of common room air purifiers. The adsorbent's column was determined according to the heater dimensions. The heater length inside the column is 15 cm. Therefore, the column height was selected to be 22 cm for safety. The column width was decided to be 15 cm to be fitted on the fan 229.

The value of the disclosed air purification device 200 was determined by filling the gap between the excited air purifiers in the market and developing a system that is low in cost, which is expected to be highly efficient in: (1) filtering the air from pollutants; (2) detecting the $CO_2$ level; and (3) decreasing the $CO_2$ level by using a suitable $CO_2$ adsorbent.

By decreasing the $CO_2$, the device increases the chance of $O_2$ to bind with hemoglobin. Therefore, breathing deficiency symptoms will be reduced. Moreover, the device reduces the $CO_2$ levels, and the used $CO_2$ adsorbent can be regenerated inside the air purification 200 without the need of replacement, and is therefore cost efficient.

While $CO_2$ levels are described, the adsorption air purifier 200 can be used to extract other contaminants from an occupancy space. Sensing can use $CO_2$ levels or can use levels of the target contaminant extracted by the adsorption air purifier 200.

It is to be understood that the self-regenerated and eco-friendly air purification device is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A self-regenerated and eco-friendly air purification device, comprising:
   a housing;
   an adsorption column disposed in the housing, and the adsorption column having adsorption material capable of adsorbing carbon dioxide from air passing through the adsorption column;
   a fan disposed in the housing, the fan being configured for causing air to flow into the housing and through the adsorption column, thereby extracting carbon dioxide gas from the air passing through the adsorption column;
   a heater disposed in the housing and being positioned to directly heat the adsorption material, the heater being configured for discharging carbon dioxide adsorbed by the adsorption material in the adsorption column from the housing, thereby regenerating the adsorption material when the heater is activated; and
   a control unit disposed within the housing and configured for selectively activating the heater to discharge the adsorbed carbon dioxide from the adsorption material, wherein said control unit comprises a microcontroller circuit, the device further comprising:
   a temperature sensor connected to the microcontroller circuit;
   a carbon dioxide gas sensor connected to the microcontroller circuit, the fan being connected to the microcontroller circuit, the microcontroller circuit being configured to automatically activate the fan to draw air into the housing and through the adsorption column in response to signals from the carbon dioxide gas sensor indicating carbon dioxide levels exceed a threshold;
   a relay connected to said heater;
   and a PID controller between the microcontroller circuit and the relay and between the temperature sensor and the microcontroller circuit, the microcontroller circuit being configured to automatically signal relay through the PID controller to activate the heater and to signal the PID controller to monitor temperatures generated by the heater to maintain temperatures sufficient to regenerate the adsorbent material; and
   a display mounted on said housing, the display being connected to said microcontroller circuit and configured to display carbon dioxide levels in the air drawn through said housing.

2. The air purification device of claim 1, wherein the adsorption material comprises activated carbon.

3. The air purification device of claim 1, further comprising a temperature sensor disposed in the housing, said control unit being configured for adsorbing carbon dioxide gas at a temperature range corresponding to anticipated room temperatures, and for activating the heater to discharge the adsorbed carbon dioxide at a temperature range above an upper limit of the range of anticipated room temperature.

4. The air purification device according to claim 1, further comprising an air filter disposed in said housing, the air filter being configures to remove particulate matter from the air drawn into the device before the air passes through said adsorption column.

5. A method of extracting excess carbon dioxide from room air, comprising the steps of:
   retaining, within an air purifier housing, an adsorption material capable of adsorption of the excess carbon dioxide from air;
   causing the air in the room to flow through the air purifier housing over the adsorption material, thereby extracting the excess carbon dioxide from the air;
   selectively directly heating, using a heater, the adsorption material to discharge the adsorbed carbon dioxide from the adsorption material, thereby causing discharge of the carbon dioxide adsorbed by the adsorption material, resulting in regeneration of the adsorption material,
   providing a carbon dioxide gas sensor for sensing levels of carbon dioxide in room air; and
   providing a control and evaluation unit to turn on a fan to draw room air into the air purifier housing and over the adsorbent material, wherein said control and evaluation unit comprises a microcontroller circuit, the device further comprising:
   a temperature sensor connected to the microcontroller circuit;
   said carbon dioxide gas sensor connected to the microcontroller circuit, the fan being connected to the microcontroller circuit, the microcontroller circuit being configured to automatically activate the fan to draw air into the housing and through the adsorption column in response to signals from the carbon dioxide gas indicating carbon dioxide levels exceed a threshold;
   a relay connected to said heater;
   and a PID controller between the microcontroller circuit and the relay and between the temperature sensor and the microcontroller circuit, the microcontroller circuit being configured to automatically signal relay through the PID controller to activate the heater and to signal the PID controller to monitor temperatures generated by the heater to maintain temperatures sufficient to regenerate the adsorbent material; and
   providing a display mounted on said housing, the display being connected to said microcontroller circuit and configured to display carbon dioxide levels in the air drawn through said air purifier housing.

6. The method of extracting excess carbon dioxide from room air of claim 5, wherein the adsorption material comprises activated carbon.

7. The method of extracting excess carbon dioxide from room air of claim 5, wherein the adsorption material adsorbs carbon dioxide at a temperature range within a range of anticipated room temperatures, and discharges the absorbed carbon dioxide at a temperature range above an upper limit of the range of anticipated room temperature.

8. An air purification device, comprising:
   a housing;
   an adsorption material capable of adsorbing excess carbon dioxide from air;
   means disposed within the housing for retaining said adsorption material capable of adsorbing excess carbon dioxide from air;
   means disposed within the housing causing air in a room of a building to flow through the housing over the adsorption material, thereby extracting carbon dioxide from the air at a range of room temperatures suitable for occupancy; and means disposed within the housing positioned for selectively directly heating the adsorption material to discharge the adsorbed carbon dioxide from the adsorption material to adsorb additional carbon dioxide;

means disposed within the housing for sensing levels of carbon dioxide in room air; and a control and evaluation unit to turn on a fan to draw room air into the air purifier housing and over the adsorbent material, wherein said control and evaluation unit comprises a microcontroller circuit, the device further comprising:

a temperature sensor connected to the microcontroller circuit;

said means for sensing levels of carbon dioxide connected to the microcontroller circuit, the fan being connected to the microcontroller circuit, the microcontroller circuit being configured to automatically activate the fan to draw air into the housing and through the adsorption column in response to signals from said means for sensing levels of carbon dioxide indicating carbon dioxide levels exceed a threshold;

a relay connected to said means disposed within the housing positioned for selectively directly heating;

and a PID controller between the microcontroller circuit and the relay and between the temperature sensor and the microcontroller circuit, the microcontroller circuit being configured to automatically signal relay through the PID controller to activate said means disposed within the housing positioned for selectively directly heating and to signal the PID controller to monitor temperatures generated by said means disposed within the housing positioned for selectively directly heating to maintain temperatures sufficient to regenerate the adsorbent material; and a display mounted on said housing, the display being connected to said microcontroller circuit and configured to display carbon dioxide levels in the air drawn through said air purifier housing.

9. The air purification device of claim 8, wherein the adsorption material comprises activated carbon.

10. The air purification device of claim 8, wherein the adsorption material adsorbs the excess carbon dioxide gas from the air at room temperature and discharges the adsorbed carbon dioxide at a temperature above room temperature.

* * * * *